United States Patent
Takayanagi et al.

(10) Patent No.: US 7,063,179 B2
(45) Date of Patent: Jun. 20, 2006

(54) TRICYCLE WITH A ROCKING MECHANISM

(75) Inventors: Shinji Takayanagi, Saitama (JP); Yohei Makuta, Saitama (JP); Hiroyoshi Kobayashi, Saitama (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 270 days.

(21) Appl. No.: 10/606,363

(22) Filed: Jun. 26, 2003

(65) Prior Publication Data

US 2004/0040770 A1 Mar. 4, 2004

(30) Foreign Application Priority Data

Jul. 5, 2002 (JP) .............................. 2002-197455

(51) Int. Cl.
*B62D 61/06* (2006.01)
(52) U.S. Cl. .................................................. 180/210
(58) Field of Classification Search ................ 180/210;
280/5.5, 5.502, 5.504, 5.506, 5.507, 5.508,
280/5.509, 124.103, 124.106
See application file for complete search history.

(56) References Cited

U.S. PATENT DOCUMENTS

| | | | |
|---|---|---|---|
| 2,152,938 A * | 4/1939 | Welch | 280/124.103 |
| 4,360,224 A * | 11/1982 | Sato et al. | 280/269 |
| 4,546,997 A | 10/1985 | Smyers | |
| 5,240,267 A * | 8/1993 | Owsen | 280/240 |
| 5,324,056 A * | 6/1994 | Orton | 280/124.106 |
| 6,250,649 B1 | 6/2001 | Braun | |
| 6,817,617 B1 * | 11/2004 | Hayashi | 280/5.509 |
| 6,827,361 B1 * | 12/2004 | Seki | 280/124.134 |
| 2003/0116935 A1 * | 6/2003 | Zadok | 280/124.106 |

FOREIGN PATENT DOCUMENTS

| | | | |
|---|---|---|---|
| DE | 200 17 449 U1 | | 12/2000 |
| JP | 60104467 A | * | 6/1985 |
| JP | 63090413 A | * | 4/1988 |
| JP | 01285415 A | * | 11/1989 |

* cited by examiner

*Primary Examiner*—Faye M. Fleming
(74) *Attorney, Agent, or Firm*—Birch, Stewart, Kolasch & Birch, LLP

(57) ABSTRACT

A tricycle with independently-suspended rear wheels and having a rocking mechanism and a single shock absorber used to effect the damping action of both the left and the right suspension arms connected to the rear wheels. The left and right suspension arms are connected by a shock absorber and arcuate links and bell cranks provided at the opposite ends of the shock absorber. In response to upward and downward movement of the left and right suspension arms, the single shock absorber can be expanded and contracted to effect damping action of the left and right suspension arms. Accordingly, weight and cost can be reduced when compared with a conventional tricycle having two shock absorbers, one provided for each of the left and right suspension arms.

20 Claims, 17 Drawing Sheets

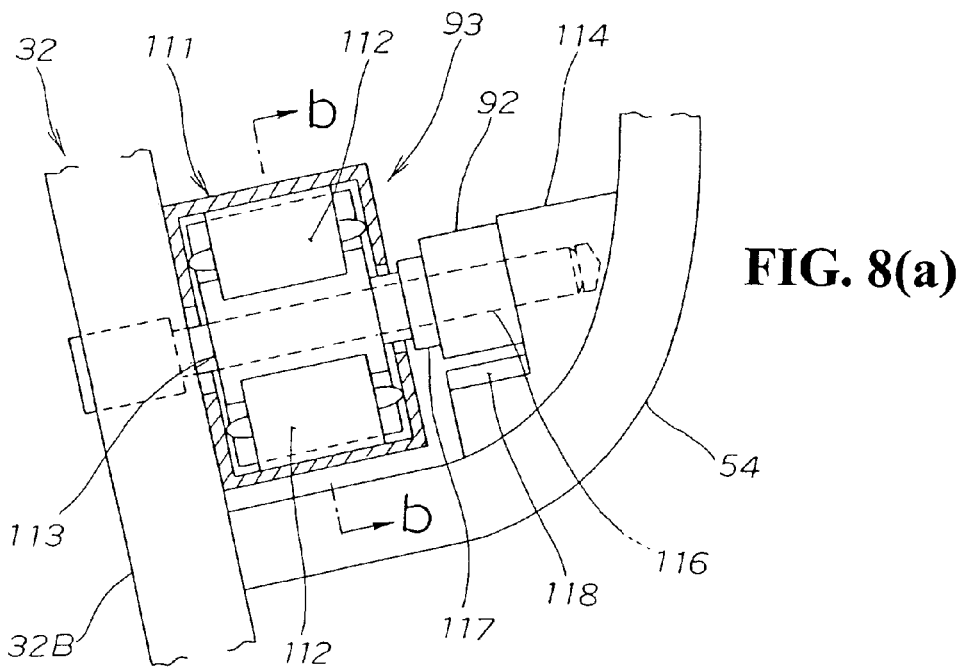
FIG. 8(a)
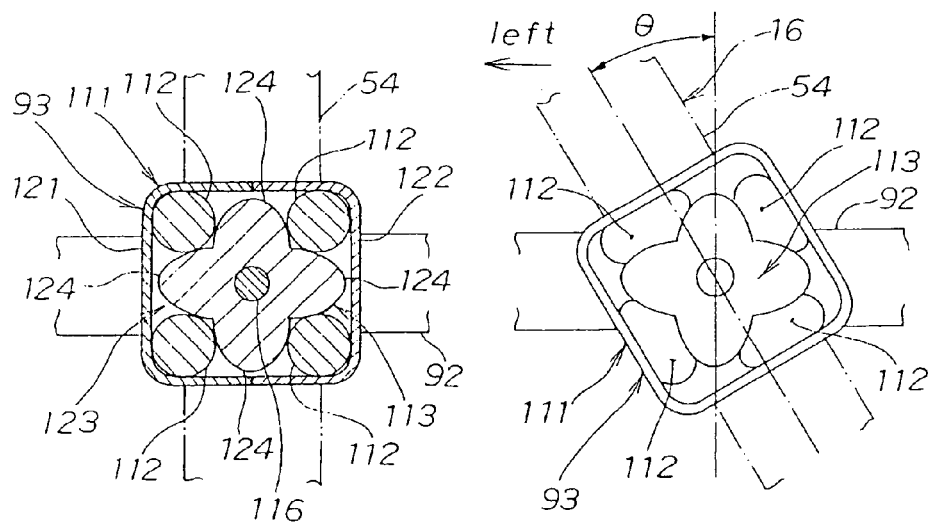
FIG. 8(b)   FIG. 8(c)

TRICYCLE WITH A ROCKING MECHANISM

CROSS-REFERENCE TO RELATED APPLICATION

The present application claims priority under 35 U.S.C. §119 to Japanese Patent Application No. 2002-197455, filed Jul. 5, 2002, the entire contents of which are hereby incorporated by reference.

BACKGROUND OF THE INVENTION

1. Field of the Invention

This invention relates to a tricycle with independently-suspended rear wheels and having a rocking mechanism wherein a single shock absorber is used to effect the damping action of both the left and the right suspension arms connected to the rear wheels. 2. Description of Background Art As a suspension for a vehicle, one disclosed, for example, in the official gazette of Japanese Patent Publication No. Hei 5-87430 "Saddle Type Four Wheel Car for Running on an Irregular Ground" is known.

FIG. 6 of the official gazette mentioned is described below with reference to FIG. 17. It is to be noted that renumbered reference numerals are used in FIG. 17.

FIG. 17 is a sectional view showing the conventional suspension and shows a wishbone type front suspension 207 wherein a lower arm 203 and an upper arm 204 extend between a vehicle body 200 side and a knuckle 202 on which a front wheel 201 is supported for rotation and a progressive link 205 is mounted at an upper portion of the upper arm 204 while a shock absorber 206 is mounted between an end of the progressive link 205 and a vehicle body 200. It is to be noted that also another front suspension on which the other front wheel 201 is suspended is similar to the front suspension 207. Also shown are king pins 211 and 212.

The front wheels 201, 201 are suspended independently of each other between the left and right sides and the shock absorbers 206 are provided individually on the left and right. If the shock absorbers could be combined into a single shock absorber providing damping actions for the left and right front wheels 201, 201, then the weight could be reduced and the cost could be reduced.

SUMMARY AND OBJECTS OF THE INVENTION

Therefore, it is an object of the present invention to improve a tricycle with a rocking mechanism to form a single shock absorber for left and right rear wheel suspensions independently of each other, in order to achieve reduction in weight and cost.

In order to attain the object described above, according a first aspect of the present invention, a tricycle is provided with a rocking mechanism wherein a pair of suspension arms extending leftwardly and rightwardly from a body frame and rear wheels are mounted for upward and downward movement independently of each other on the suspension arms. The rocking mechanism for permitting leftward and rightward rocking movement of the body frame with respect to the suspension arms side is provided between the suspension arms side and the body frame side, and the left and right suspension arms are connected to each other by resilient means and connection means provided at the opposite ends of the resilient means.

In response to upward and downward movement of the left and right suspension arms, the single resilient means can be expanded and contracted through the connection means to effect damping action of the left and right suspension arms, and according to the present invention, the weight can be reduced and the cost can be reduced when compared with the conventional tricycle wherein a shock absorber is provided for each of the left and right suspension arms.

According to a second aspect of the present invention, the connection means includes links mounted for swinging movement on the suspension arms and substantially L-shaped bell cranks mounted for swinging movement at ends of the links. In addition, a first fulcrum is provided at a bent portion of each of the bell cranks and second and third fulcra are provided at the two end portions of each of the bell cranks, the first fulcra are mounted at the ends of the links and the second fulcra are mounted on the body frame side while the third fulcra are mounted at the end portions of the resilient means.

In response to upward and downward movements of the suspension arms, the bell cranks can be swung through the links, and the resilient means provided between the left and right bell cranks can be expanded and contracted. Consequently, damping action can be performed with the single resilient means.

According to a third aspect of the present invention, the left and right bell cranks are connected at the second fulcra thereof to end portions of a connection member while a middle portion of the connection members is mounted for swinging movement on the body frame, and the connection member and the resilient means are disposed substantially in parallel to each other.

A parallel link mechanism can be formed from the left and right suspension arms, left and right links, left and right bell cranks and connection member, and when the body frame rocks leftwardly and rightwardly, the distance between the third fulcra of the left and right bell cranks can be kept fixed, and the resilient means is not expanded nor contracted at all. Consequently, rocking movement of the body frame does not have an influence upon the damping action of the resilient means.

According to a fourth aspect of the present invention, the resilient means is disposed above the connection member.

If the suspension arms swing upwardly, then the distance between the third fulcra of the bell cranks decreases. According to the present invention, the resilient mean is used in a form of use similar to that of shock absorbers disposed on the left and right as in the conventional tricycle. Thus, in the present invention, a single conventional shock absorber can be diverted for this purpose, and there is no need to design a new shock absorber, and thus an increase in cost can be suppressed.

Further, the resilient means can be covered from below with the connection member, and thus protecting the resilient means from splashed mud, flying stones, and so forth.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8(a)–8(c) are schematic views of a rocking mechanism according to the present invention;

DETAILED DESCRIPTION OF THE PREFERRED EMBODIMENTS

Figure 1:
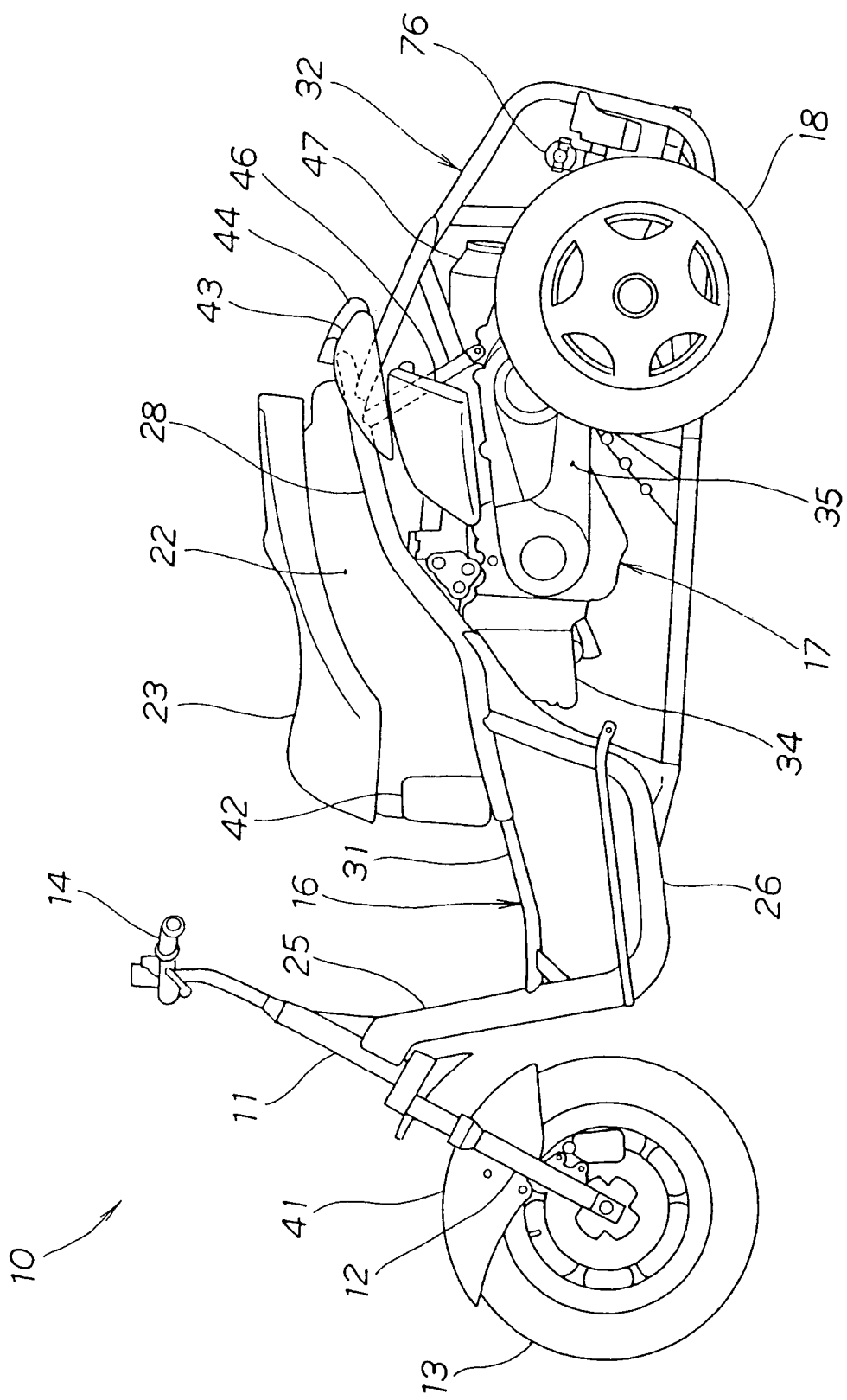
FIG. 1 is a side elevational view of a tricycle with a rocking mechanism according to the present invention.

FIG. 1 is a side elevational view of a tricycle with a rocking mechanism according to the present invention. The tricycle 10 with a rocking mechanism (hereinafter referred to simply as "tricycle 10") includes a front fork 12 mounted for steering operation on a head pipe 11 through a handle shaft not shown, a front wheel 13 mounted at a lower end of the front fork 12, a handle bar 14 integrally mounted on the front fork 12, and a body frame 16 mounted at a rear portion of the head pipe 11. Also provided are a power unit 17 mounted at a rear portion of the body frame 16, left and right rear wheels 18 and 21 (the rear wheel 21 on the far side is not shown) for being driven by the power unit 17, an accommodation box 22 mounted at an upper portion of the body frame 16, and a seat 23 mounted for opening and closing movement at an upper portion of the accommodation box 22.

The body frame 16 includes a down pipe 25 extending obliquely downwardly rearwards from the head pipe 11, a pair of left and right lower pipes 26 and 27 (the far side lower pipe 27 is not shown) extending further obliquely upwardly rearwards from a lower portion of the down pipe 25, a center upper frame 28 connected to rear portions of the lower pipes 26 and 27, a center pipe 31 extending rearwardly from the down pipe 25 and connected to the center upper frame 28, and a J frame 32 having a J shape in side elevation and connected to rear portions of the lower pipes 26 and 27 and a rear portion side of the center upper frame 28.

The center upper frame 28 is a member on which the accommodation box 22 is supported and the power unit 17 is suspended.

The J frame 32 is a member to which a rear suspension on which the rear wheels 18 and 21 are suspended and a rocking mechanism for permitting leftward and rightward rocking movement of the body frame 16 side with respect to the rear suspension side. The rear suspension and the rocking mechanism are hereinafter described in detail.

The power unit 17 includes an engine 34 disposed on the front side of the vehicle body, and a power transmission mechanism 35 for transmitting power of the engine 34 to the rear wheels 18 and 21.

Also shown are, a front fender 41 which covers the front wheel 13 from above, a battery 42, a winker 43, a tail lamp 44, an air cleaner 46, and a muffler 47.

Figure 2:
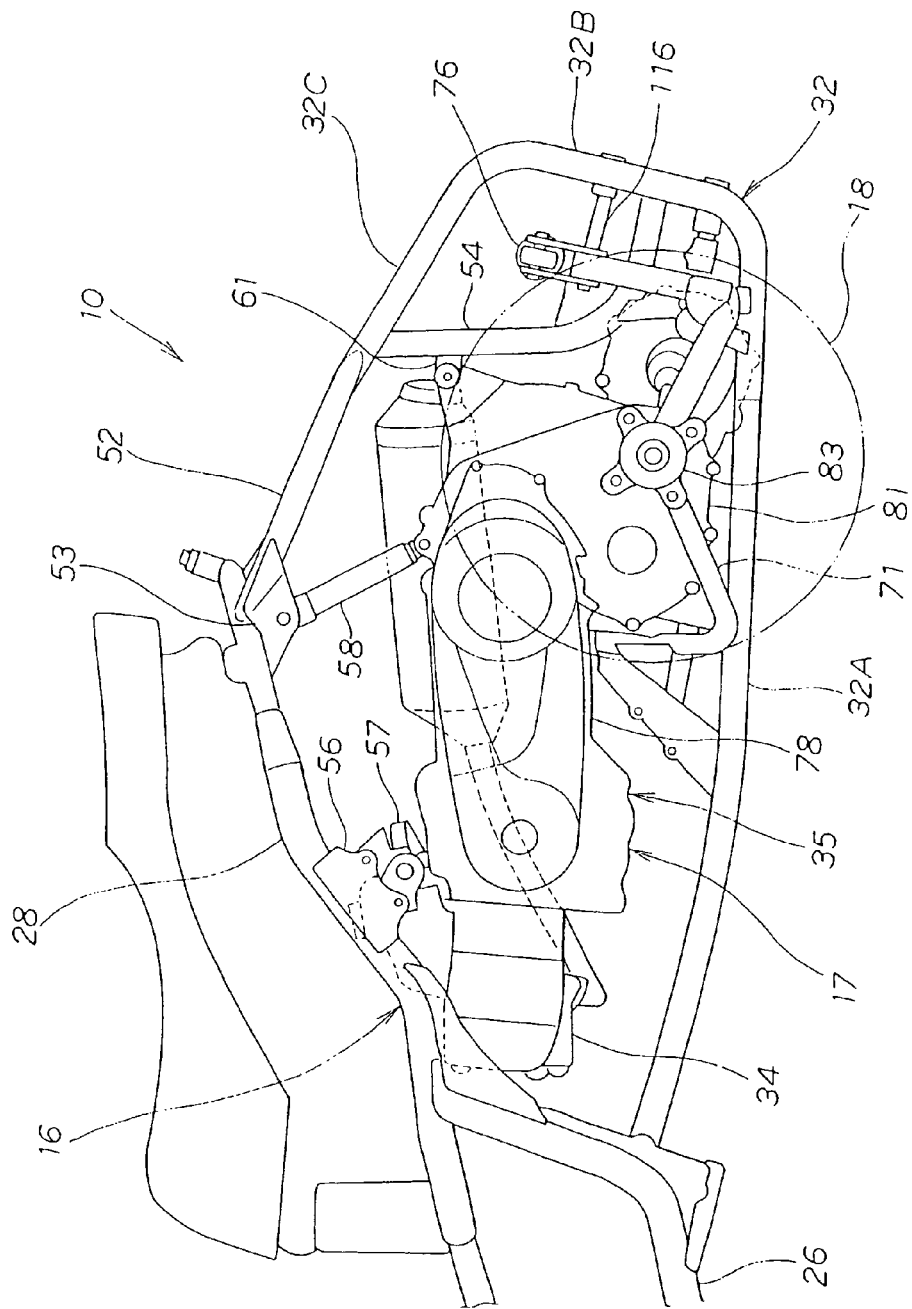
FIG. 2 is a side elevational view of essential part of the tricycle according to the present invention.

FIG. 2 is a side elevational view of essential part of the tricycle according to the present invention and shows that connection pipes 52, 52 (the far side connection pipe 52 is not shown) extend between the J frame 32 and the center upper frame 28 in order to connect an upper portion of the J frame 32 and a rear end of the center upper frame 28 to each other. Reinforcement plates 53, 53 are mounted on the connection pipes 52, 52 and the center upper frame 28; that an L pipe 54 having a substantially L shape in side elevation is mounted on the inner side of a rear portion of the J frame 32. Brackets 56, 56 (the bracket 56 on the far side is not shown) are mounted on the center upper frame 28. The power unit 17 is mounted at a front upper portion thereof on the brackets 56, 56 through a relaying member 57, a support rod 58 extends obliquely rearwardly downwards from the reinforcement plates 53, 53 to support a rear portion of the power unit 17, and a projection 61 extends forwardly from a front portion of the L pipe 54 to mount a rear end portion of the power unit 17. The J frame 32 includes a lower horizontal portion 32A extending substantially horizontally, a rear end inclined portion 32B having an upper end side is displaced rearwardly with respect to a lower end side, and an upper inclined portion 32C having a front end portion displaced upwardly with respect to a rear end portion.

Figure 3:
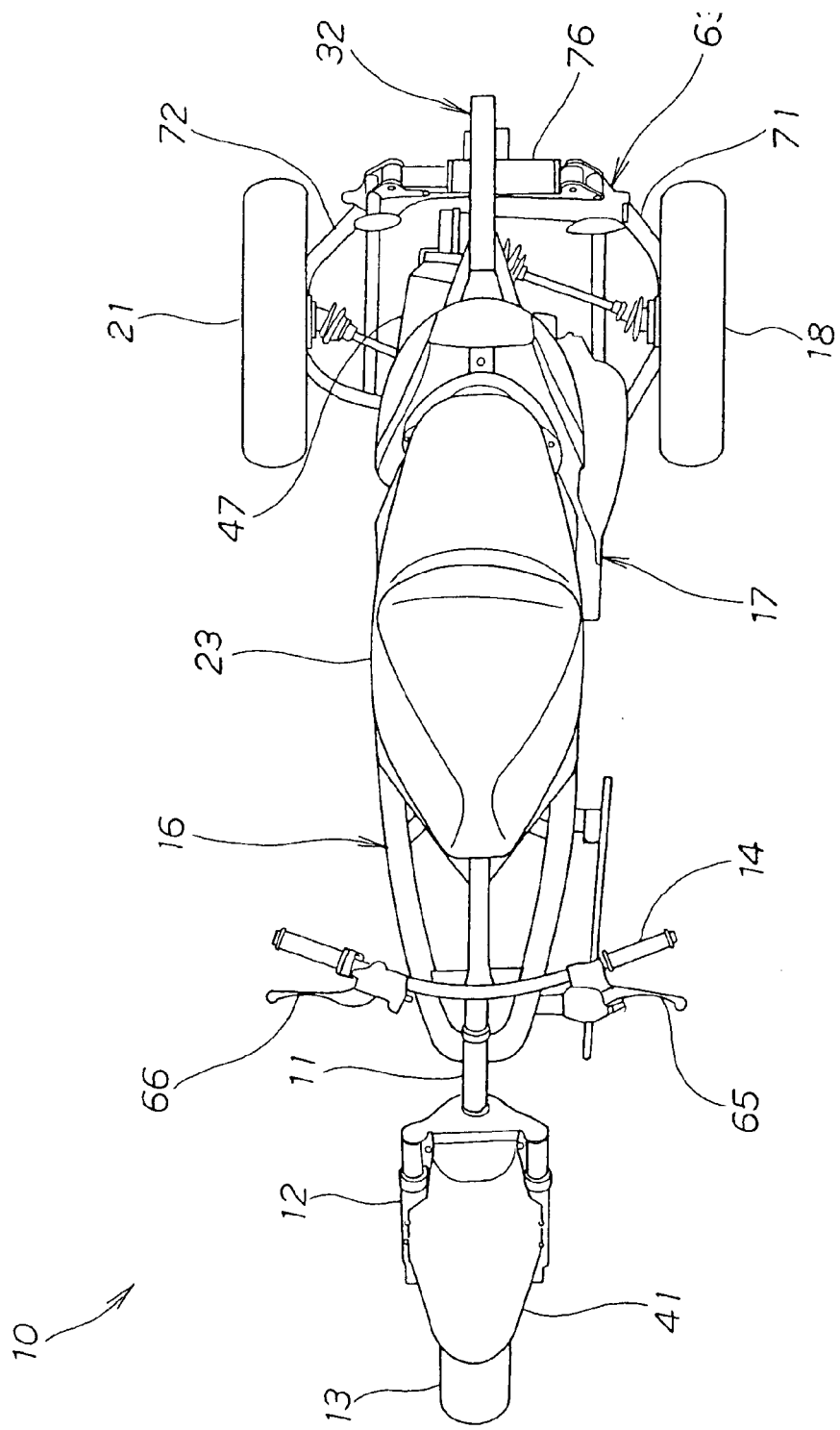
FIG. 3 is a plan view of the tricycle according to the present invention.

FIG. 3 is a plan view of the tricycle according to the present invention and shows that a rear portion of the J frame 32 is formed from a single pipe and a rear suspension 63 (details of which are hereinafter described) is mounted on the J frame 32. It is to be noted that reference numeral 65 denotes a brake lever for the rear wheel, and 66 a brake lever for the front wheel.

Figure 4:
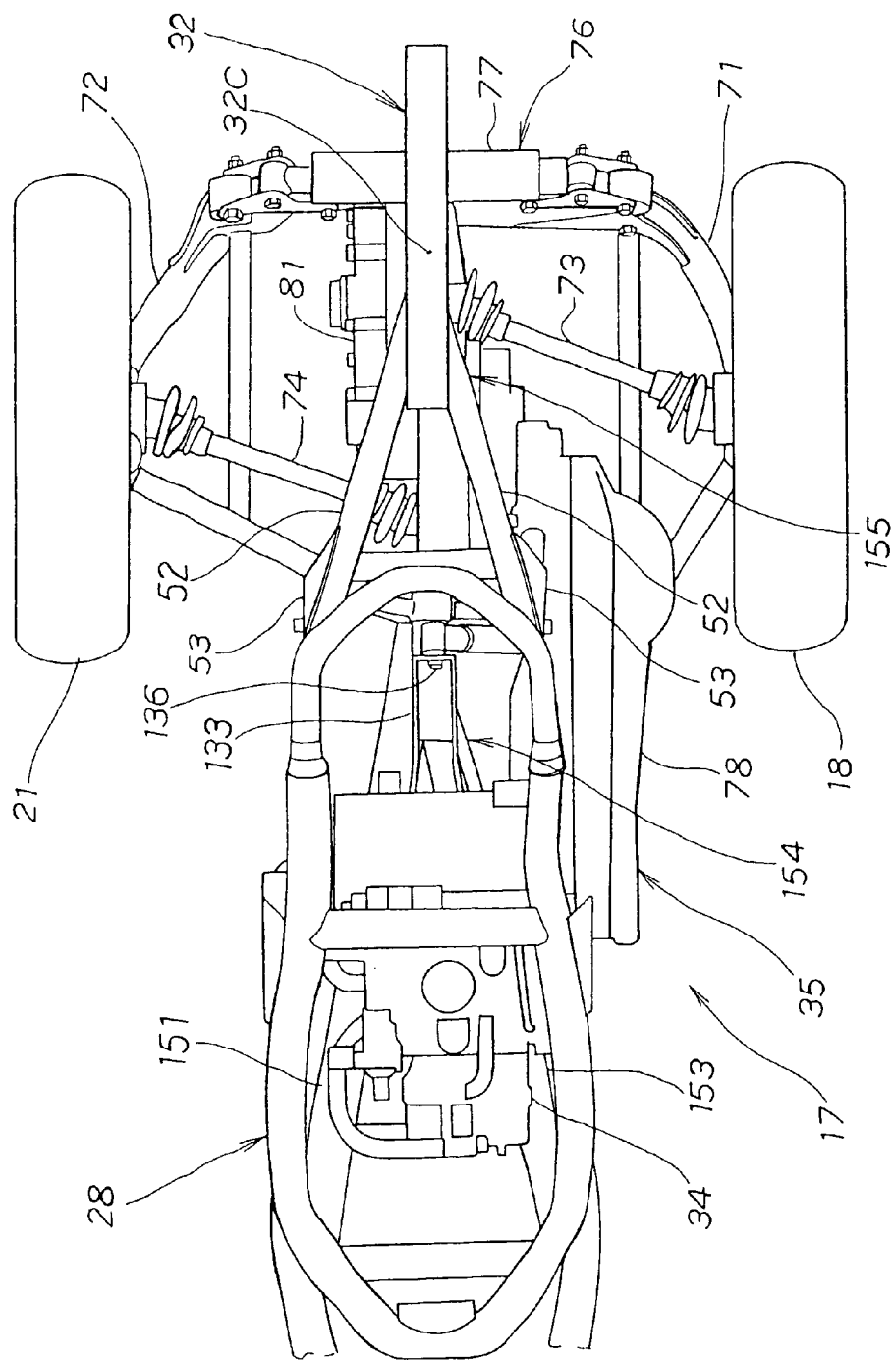
FIG. 4 is a plan view of essential part of the tricycle according to the present invention.

FIG. 4 is a plan view of essential part of the tricycle according to the present invention and shows that the tricycle is structured such that suspension arms 71 and 72 are mounted on the left and right of the J frame 32 and a holder (not shown) is mounted at an end of each of the suspension arms 71 and 72. The rear wheels 18 and 21 are mounted for rotation on the holders and are driven by drive shafts 73 and 74 extending from the power transmission mechanism 35 of the power unit 17.

Shock absorber 76 serving as resilient means is composed of a damper 77 and a compression coil spring (not shown). The shock absorber 76 is connected to the left and right suspension arms 71 and 72.

The center upper frame 28 is a substantially elliptical member, and the accommodation box 22 (refer to FIG. 1)

having a bottom of the substantially same shape is mounted at an upper portion of the center upper frame 28.

The power transmission mechanism 35 of the power unit 17 includes a non-stage transmission 78 of the belt type extending rearwardly from a left rear portion of the engine 34 and a gear box 81 connected to a rear portion of the non-stage transmission 78. The drive shaft 74 is connected to a front side output power shaft of the gear box 81 while the drive shaft 73 is connected to a rear side output power shaft of the gear box 81.

Figure 5:
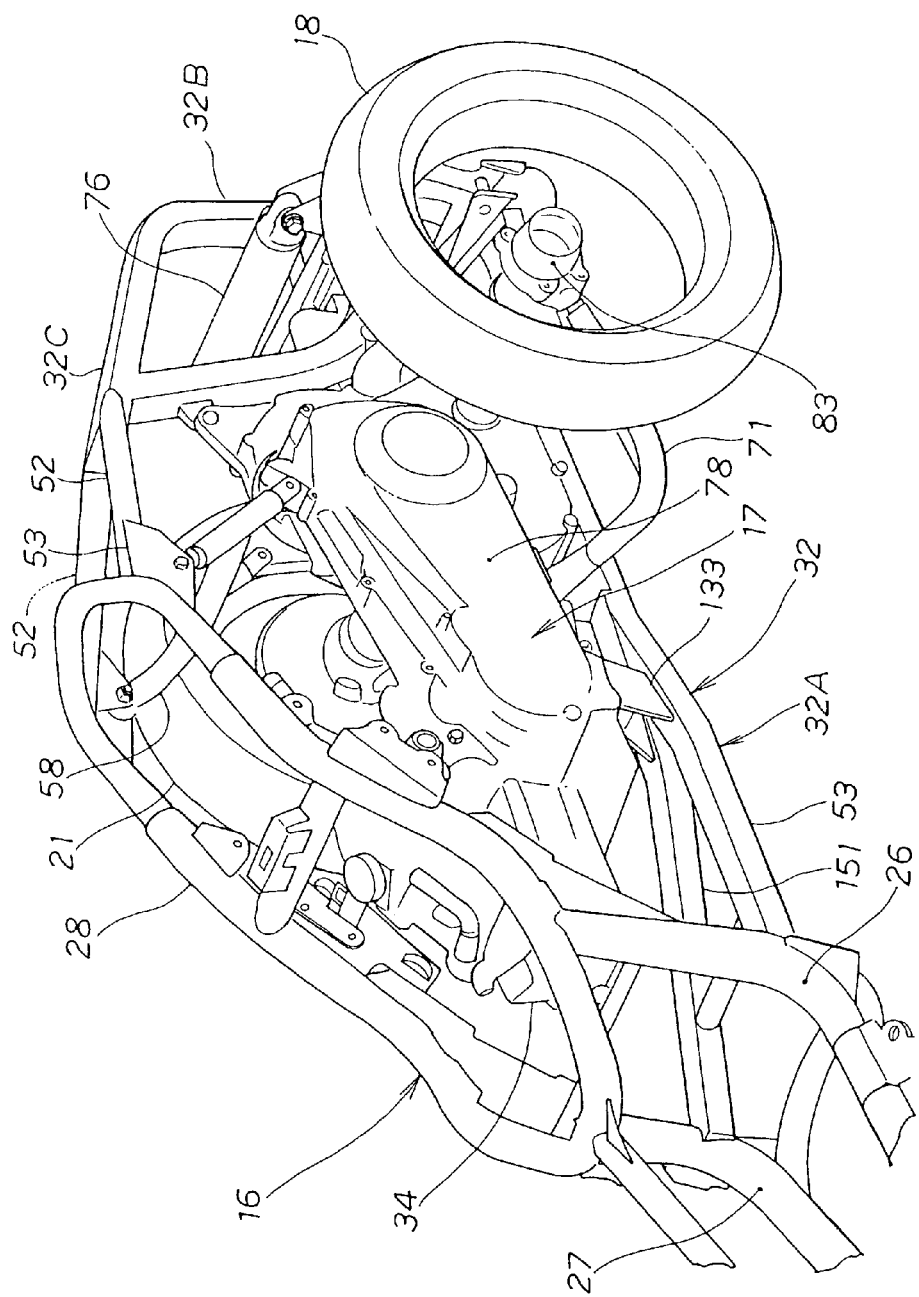
FIG. 5 is a first perspective view of the tricycle according to the present invention.

FIG. 5 is a first perspective view of the tricycle according to the present invention. A front portion of the J frame 32 is mounted to rear portions of the lower pipes 26 and 27 of the body frame 16. Also shown is a holder 83 (the far side holder 83 is not shown).

Figure 6:
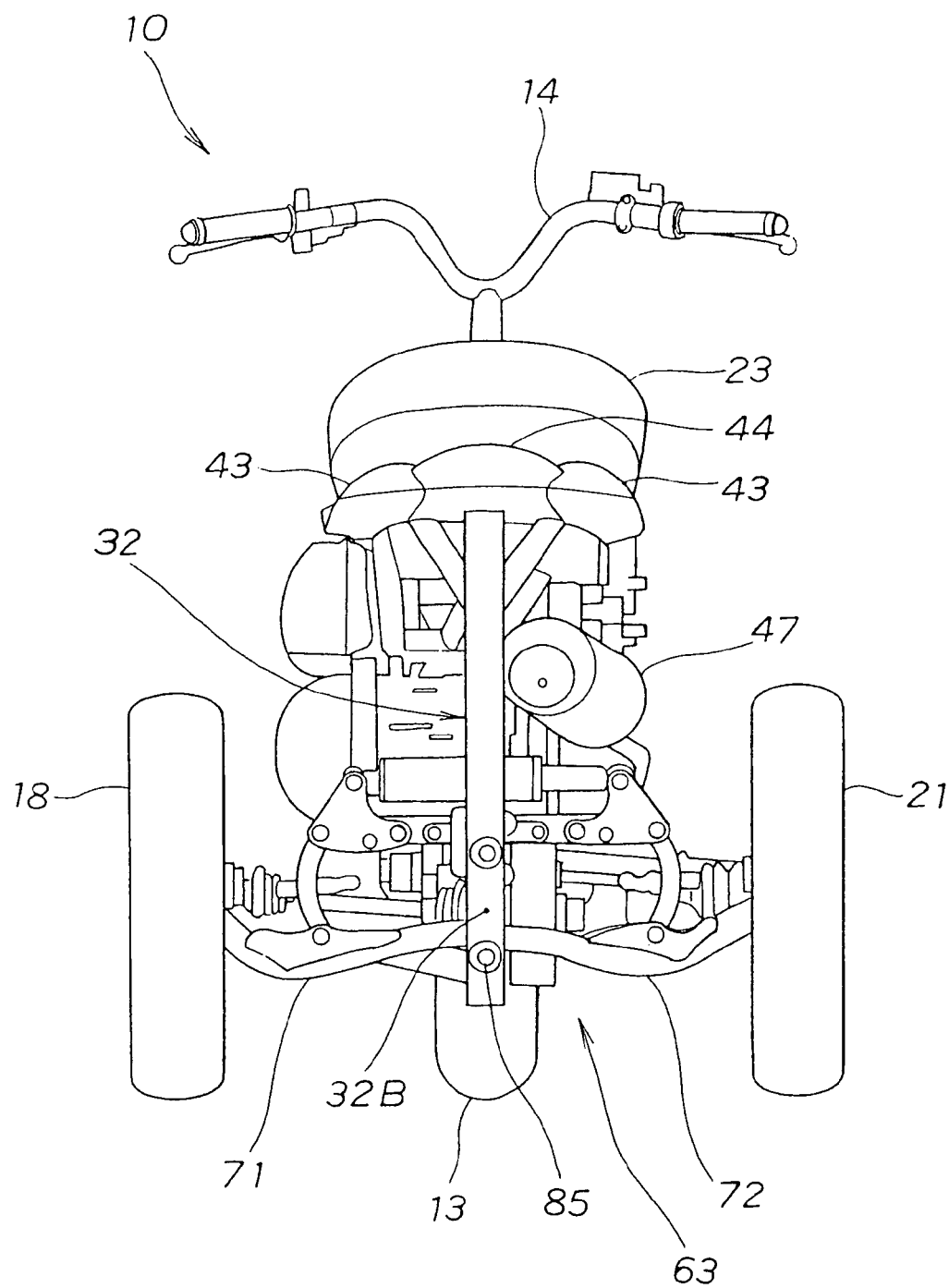
FIG. 6 is a rear elevational view of the tricycle according to the present invention.

FIG. 6 is a rear elevational view of the tricycle according to the present invention. The rear end inclined portion 32B of the J frame 32 is a portion which extends substantially vertically in a state wherein no person gets on the tricycle 10 and the suspension arms 71 and 72 are mounted at rear portions thereof to the rear end inclined portion 32B. It is to be noted that a rear swing shaft 85 is provided for mounting rear portions of the suspension arms 71 and 72 for swinging movement on the rear end inclined portion 32B.

Figure 7:
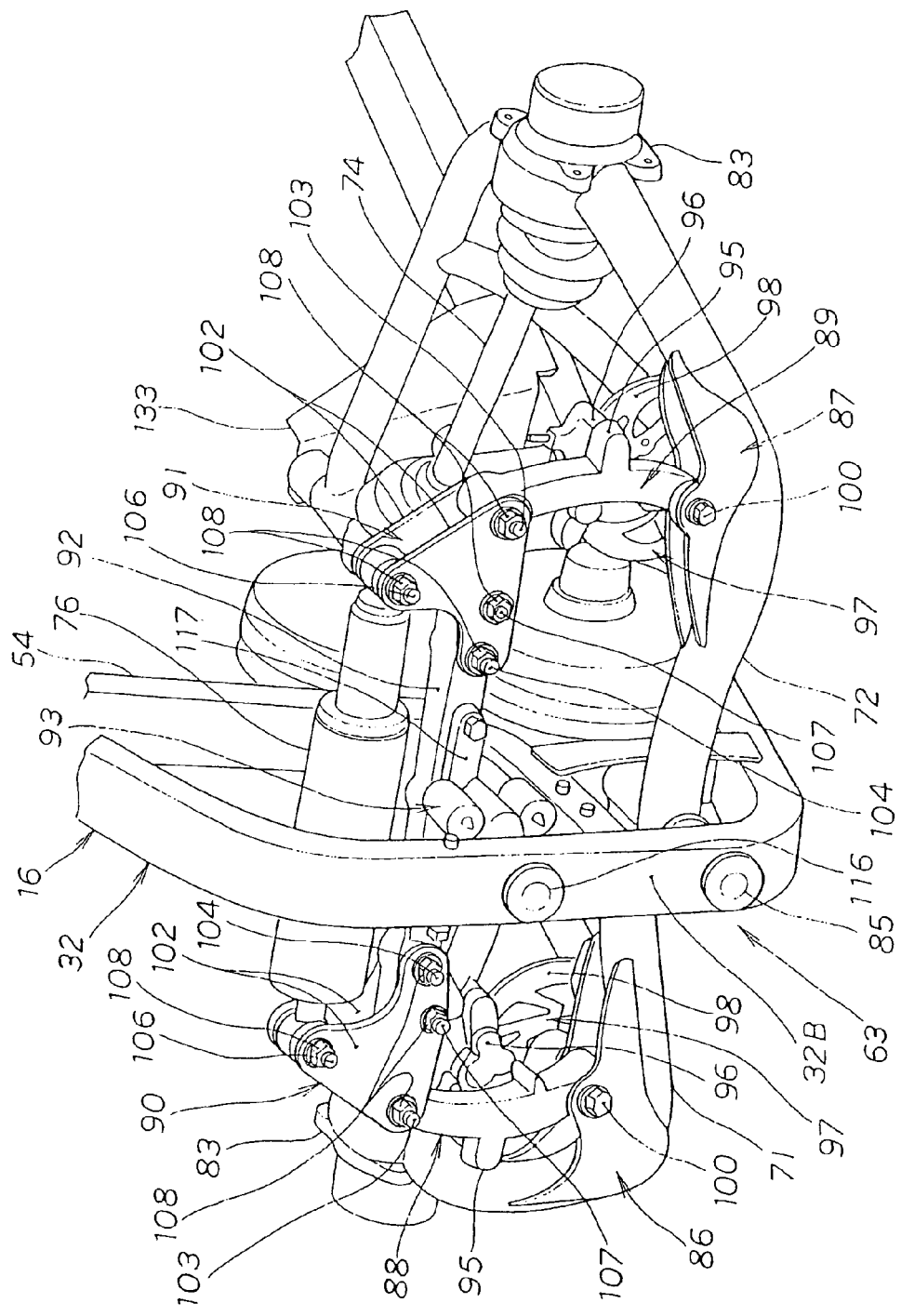
FIG. 7 is a second perspective view of the tricycle according to the present invention.

FIG. 7 is a second perspective view of the tricycle according to the present invention and shows the rear suspension 63 with the suspension arms 71 and 72 extending leftwardly and rightwardly from the J frame 32. The holders 83, 83 are mounted at ends of the suspension arms 71 and 72, and arcuate links 88 and 89 serving as connection means are mounted for swinging movement at upper portions of the suspension arms 71 and 72 through mounting brackets 86 and 87, respectively. Bell cranks 90 and 91 each having a substantially L-shape in side elevation and serving as connection means are mounted for swinging movement at ends of the arcuate links 88 and 89, respectively. The shock absorber 76 extends between upper end portions of the bell cranks 90 and 91, a bar-like connection member 92 extends between side end portions of the bell cranks 90 and 91, and the connection member 92 is mounted on the rear end inclined portion 32B of the J frame 32 through a rocking mechanism 93.

The arcuate links 88 and 89 are members each of which has a side projection 95 at a middle portion thereof and on which brake calipers 96, 96 for braking the swinging movement of the arcuate links 88 and 89 are mounted. Brake apparatuses 97, 97 include the brake calipers 96, 96 and disks 98, 98 which are hydraulically sandwiched by the brake calipers 96, 96. The disks 98, 98 are members individually mounted on the suspension arms 71 and 72. A bolt 100 serves as a shaft for swinging movement of the arcuate links 88 and 89.

Each of the bell cranks 90 and 91 is composed of two crank plates 102, 102 and includes a first bolt 103 serving as a first fulcrum, a second bolt 104 serving as a second fulcrum and a third bolt 106 serving as a third fulcrum. A fourth bolt 107 serves as a stopper pin for restricting the extending and contracting movement of the shock absorber 76. Nuts 108 are screwed onto each of the first bolt 103 to fourth bolt 107.

Upon cornering, the rocking mechanism 93 permits leftward and rightward rocking movement of the body frame 16 with respect to the suspension arms 71 and 72. A reactive force is produced by the resilient member 76 as the inclination of the rocking movement increases, thereby returning the body frame 16 to its initial position.

FIGS. 8(*a*) to (*c*) are schematic views of the rocking mechanism according to the present invention, FIG. 8(*a*) being a side elevational view (partial sectional view), FIG. 8(*b*) being a sectional view taken along line b—b of FIG. 8(*a*), and FIG. 8(*c*) being an action diagram with respect to FIG. 8(*b*).

Referring to FIG. 8(*a*), the rocking mechanism 93 is a so-called "Neidhardt damper" which includes a case 111 mounted on the rear end inclined portion 32B of the J frame 32 and a rear portion of the L pipe 54, damper rubber members 112 accommodated in the case 111, a pressing member 113 mounted on the connection member 92 for pressing the damper rubber members 112, and a through-pin 116 extending through the pressing member 113 and the connection member 92 and supported at the opposite end portions thereof by an end supporting portion 114 provided on the L pipe 54 and the rear end inclined portion 32B. A mounting portion 117 is provided on the pressing member 113 for mounting the pressing member 113 on the connection member 92 by means of a bolt, and a swing restriction portion 118 is provided integrally on the end supporting portion 114 for restricting the amount of the swinging movement of the connection member 92.

Referring to FIG. 8(*b*), the case 111 is a member composed of a left case 121 and a right case 122 joined together and has a damper accommodation chamber 123 provided in the inside thereof. The damper rubber members 112 are disposed at the four corners of the damper accommodation chamber 123 and are pressed by convex pressing portions 124 of the pressing member 113.

Referring to FIG. 8(*c*), if the body frame 16 is rocked leftwardly of the vehicle body (an allow mark left in the figure denotes the leftward direction of the vehicle body) with respect to the connection member 92 connected to the suspension arms side until the L pipe 54 is inclined by an angle θ, then the case 111 of the rocking mechanism 93 turns relative to the pressing member 113. This causes the damper rubber members 112 accommodated in the case 111 to be sandwiched between and compressed by the case 111 and the pressing member 113 and to exert a reactive force to return the case 111, and hence the body frame 16, to their initial positions (the positions shown in FIG. 8(*b*)).

Figure 9:
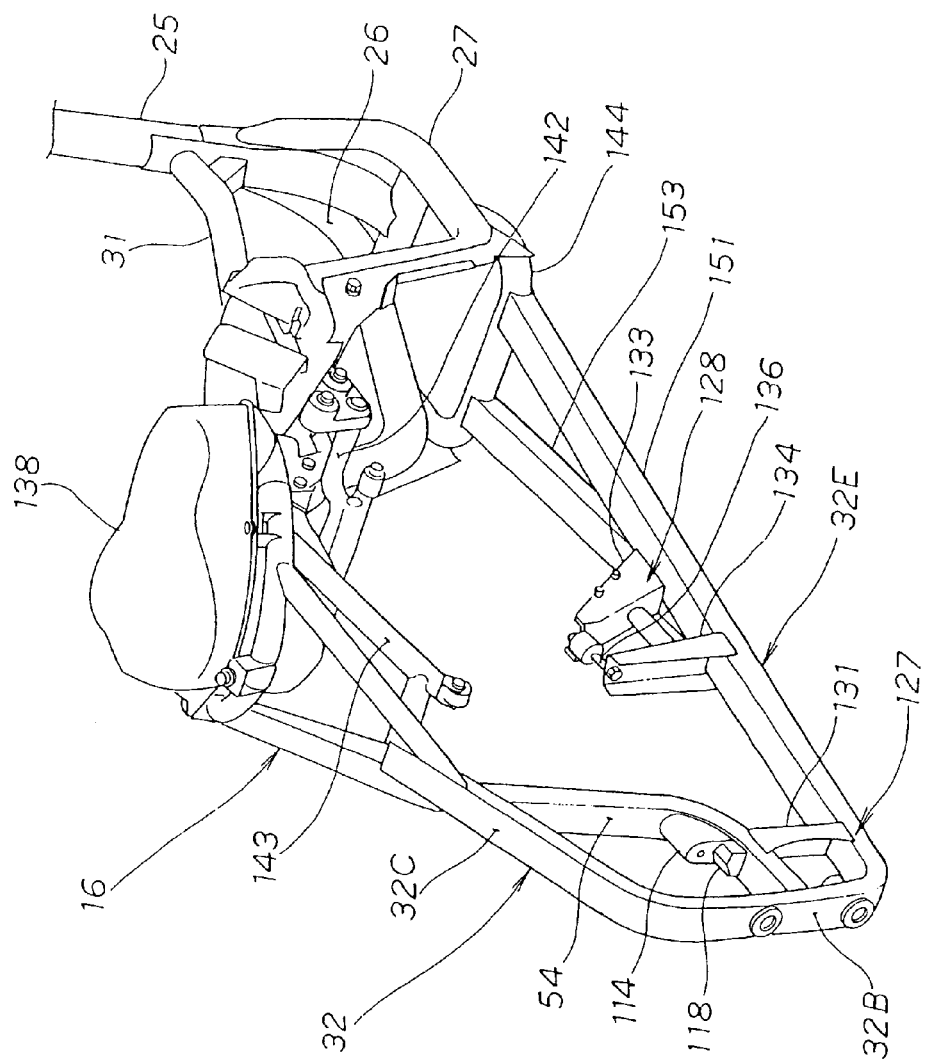
FIG. 9 is a third perspective view of the tricycle according to the present invention.

FIG. 9 is a third perspective view of the tricycle according to the present invention (a view as viewed from obliquely rearwardly of the body frame), and shows a rear mounting portion 127 for mounting rear portions of the suspension arms 71 and 72 (refer to FIG. 7) for swinging movement, and a front mounting portion 128 for mounting front portions of the suspension arms 71 and 72 for swinging movement on the J frame 32.

The rear mounting portion 127 includes the rear end inclined portion 32B and a vertical bracket 131 extending downwardly from the L pipe 54 to a lower horizontal portion 32E (hereinafter described), and a rear swing shaft (refer to FIG. 6) for supporting rear portions of the suspension arms 71 and 72 is mounted on each of the rear end inclined portion 32B and the vertical bracket 131.

The front mounting portion 128 includes a front upright portion 133 and a rear upright portion 134 spaced from each other and erected uprightly on the lower horizontal portion 32E, and a front swing shaft 136 for supporting front portions of the suspension arms 71 and 72 is mounted on each of the front upright portion 133 and the rear upright portion 134.

FIG. 9 also shows a fuel tank 138, engine mount link vibration isolators 142, 143 for carrying the engine 34 on the body frame 16, and a U-shaped U pipe 144 mounted at rear lower portions of the lower pipes 26 and 27 for mounting an end of the lower horizontal portion 32E of the J frame 32.

While FIG. 5 shows an embodiment wherein a front end of the lower horizontal portion 32A bifurcated in a Y shape is mounted directly on the lower pipes 26 and 27, FIG. 9 shows another embodiment wherein the J frame 32 is formed from a lower horizontal portion 32E bifurcated in a Y shape, a rear end inclined portion 32B, and an upper inclined portion 32C, and a front end of the lower horizontal portion 32E is mounted on the lower pipes 26 and 27 through a U pipe 144.

Figure 10:
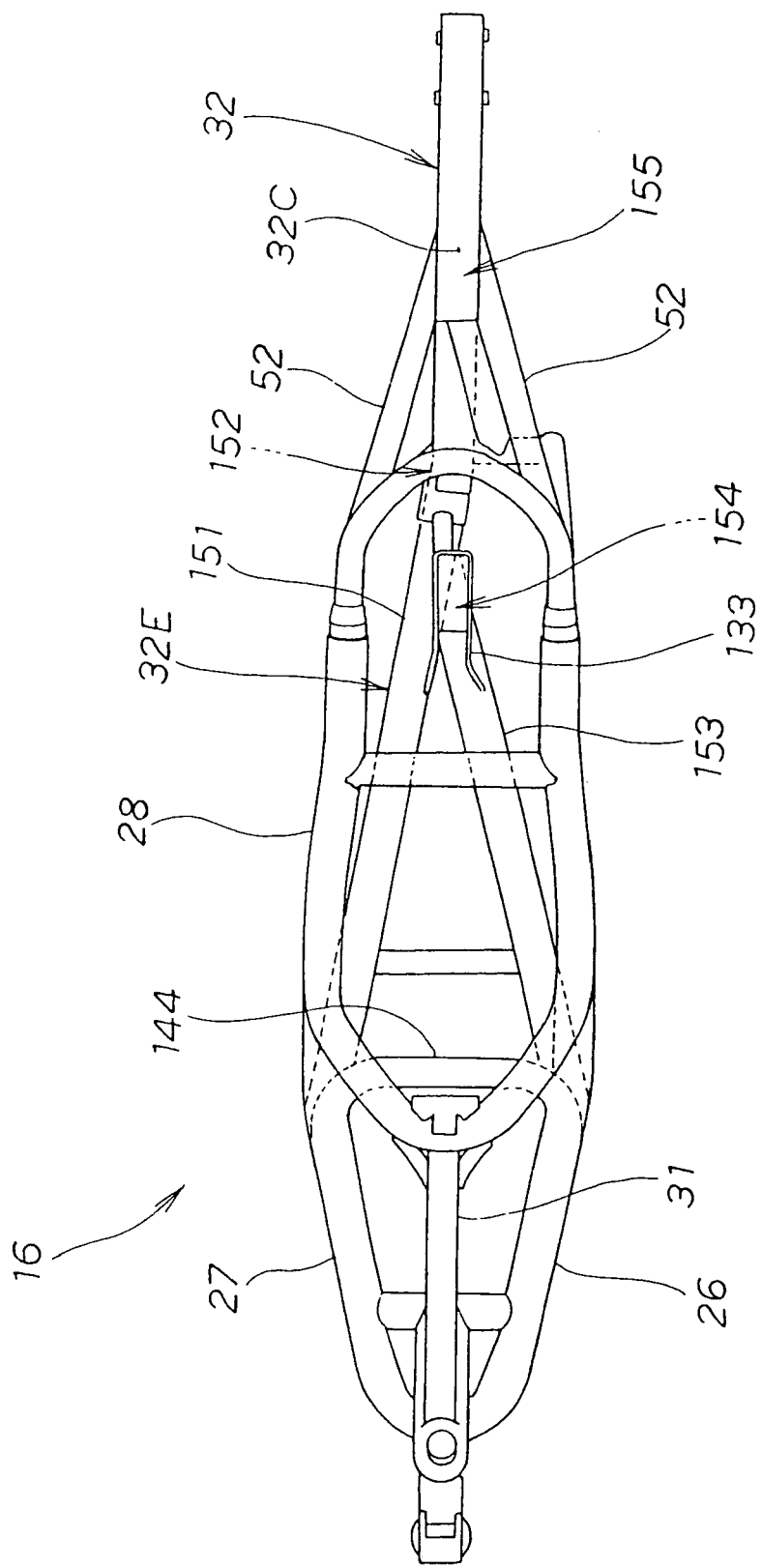
FIG. 10 is a plan view of a body frame according to the present invention.

FIG. 10 is a plan view of the body frame according to the present invention and shows the lower horizontal portion 32E of the J frame 32 being intermediately bifurcated in a Y shape and connected to a rear portion of the U pipe 144, and the connection pipes 52, 52 extending in a Y shape from the upper inclined portion 32C of the J frame 32 to the center upper frame 28.

The lower horizontal portion 32E (and the lower horizontal portion 32A (refer to FIG. 5)) particularly is a portion formed by intermediately bending a single elongated first pipe 151 and connecting a second pipe 153 to the first pipe 151 in the proximity of a bent portion 152. A Y-shaped bifurcated portion 154 connects the second pipe 153 to the first pipe 151 and bifurcated in a Y shape, and a Y-shaped bifurcated portion 155 connects the connection pipes 52, 52 to the upper inclined portion 32C.

The first pipe 151 is a member including the rear end inclined portion 32B and the upper inclined portion 32C and is a member formed by removing the second pipe 153 from the J frame 32.

By forming the lower horizontal portion 32E in a Y shape in this manner, the coupling between the lower front portion of the J frame 32 and the U pipe 144 can be made firm. In addition, by disposing the connection pipes 52, 52 in a Y shape, the coupling between the rear upper portion of the J frame 32 and the rear portion of the center upper frame 28 can also be made firm. Further, in FIG. 5, by forming the lower horizontal portion 32A in a Y shape, the coupling between the lower front portion of the J frame 32 and the lower pipes 26 and 27 can be made firm.

Figure 11:
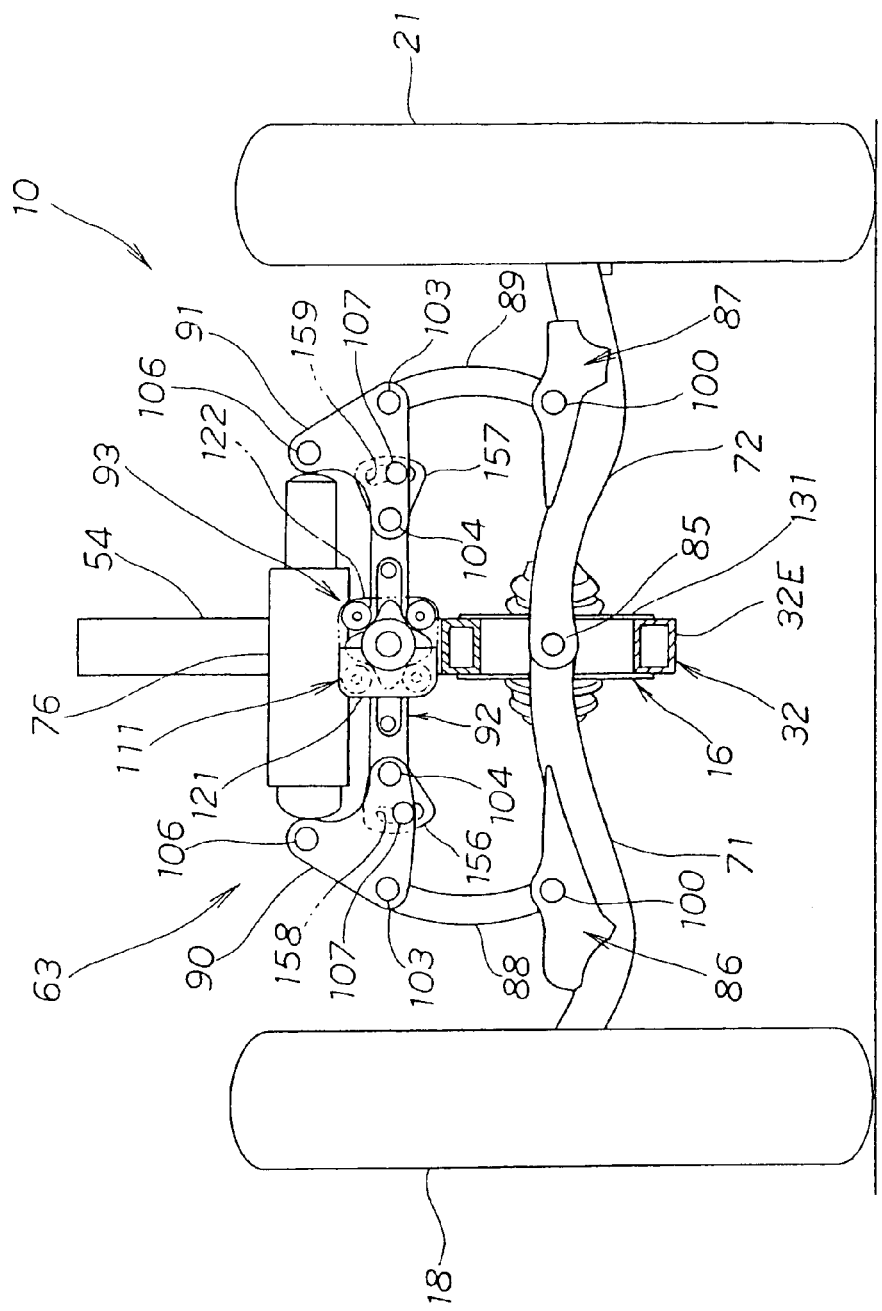
FIG. 11 is a rear elevational view of a rear suspension according to the present invention.

FIG. 11 is a rear elevational view of the rear suspension according to the present invention and shows the rear suspension 63 in a state wherein one passenger (driver) gets on the tricycle (this state is referred to as "1G state"). It is to be noted that the rear end inclined portion 32B and the upper inclined portion 32C of the J frame 32 shown in FIG. 9 are omitted. Further, the right case 122 of the rocking mechanism 93 shown in FIG. 8(b) is indicated by an imaginary line. At this time, the L pipe 54 of the body frame 16 is in a substantially vertical state, and the connection member 92 is in a substantially horizontal state.

The connection member 92 is a member which has sectoral portions 156 and 157 of a sectoral shape provided at the opposite ends thereof and has arcuate elongated holes 158 and 159 provided in the sectoral portions 156 and 157, respectively. The fourth bolts 107, 107 each serving as a stopper pin are fitted in the arcuate elongated holes 158 and 159 to restrict the inclination angles of the bell cranks 90 and 91 with respect to the connection member 92, respectively. The inclination angles of the bell cranks 90 and 91 vary depending upon the inclination angles of the suspension arms 71 and 72, that is, the amounts of upward and downward movement of the rear wheels 18 and 21, respectively. In other words, the arcuate elongated holes 158 and 159 are portions for restricting the amounts of upward and downward movement of the rear wheels 18 and 21, respectively.

Action of the rear suspension 63 described above is described below.

Figure 12:
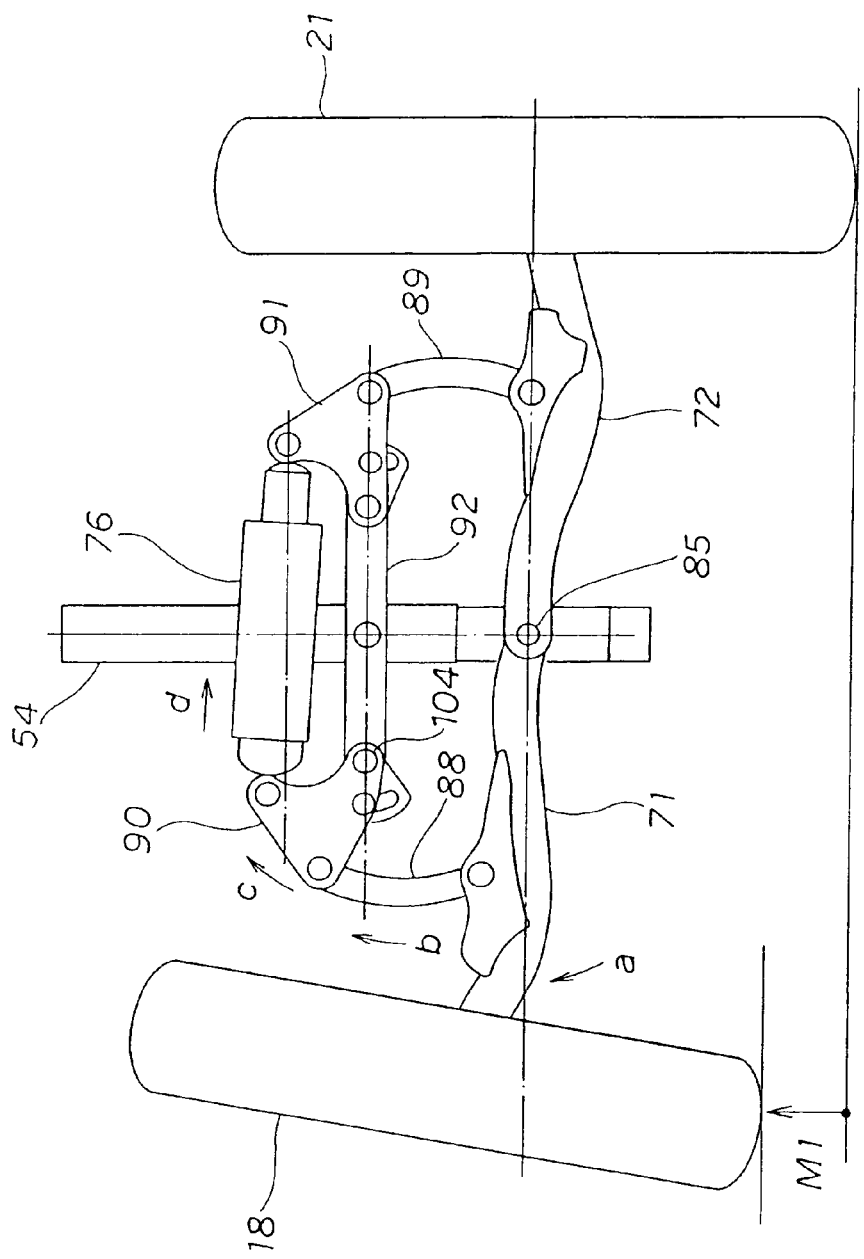
FIG. 12 is a first action diagram illustrating action of the rear suspension according to the present invention.

FIG. 12 is a first action diagram illustrating action of the rear suspension according to the present invention.

For example, if the left side rear wheel 18 moves upwardly by an movement amount M1 from the state shown in FIG. 1, then the suspension arm 71 swings upwardly as indicated by an arrow mark a around the rear swing shaft 85 and the front swing shaft 136 (refer to FIG. 9). When this occurs, the arcuate link 88 moves upwardly as indicated by an arrow mark b to swing the bell crank 90 in a direction of an arrow mark c around the second bolt 104 to compress the shock absorber 76 as indicated by an arrow mark d. Transmission of an impact to the body frame 16 (refer to FIG. 10) by an upward movement of the left side rear wheel 18 is moderated in this manner.

At this time, since the other suspension arm 72 is in a state same as that of FIG. 11, the connection member 92 remains in a substantially horizontal state similarly as in FIG. 11.

Figure 13:
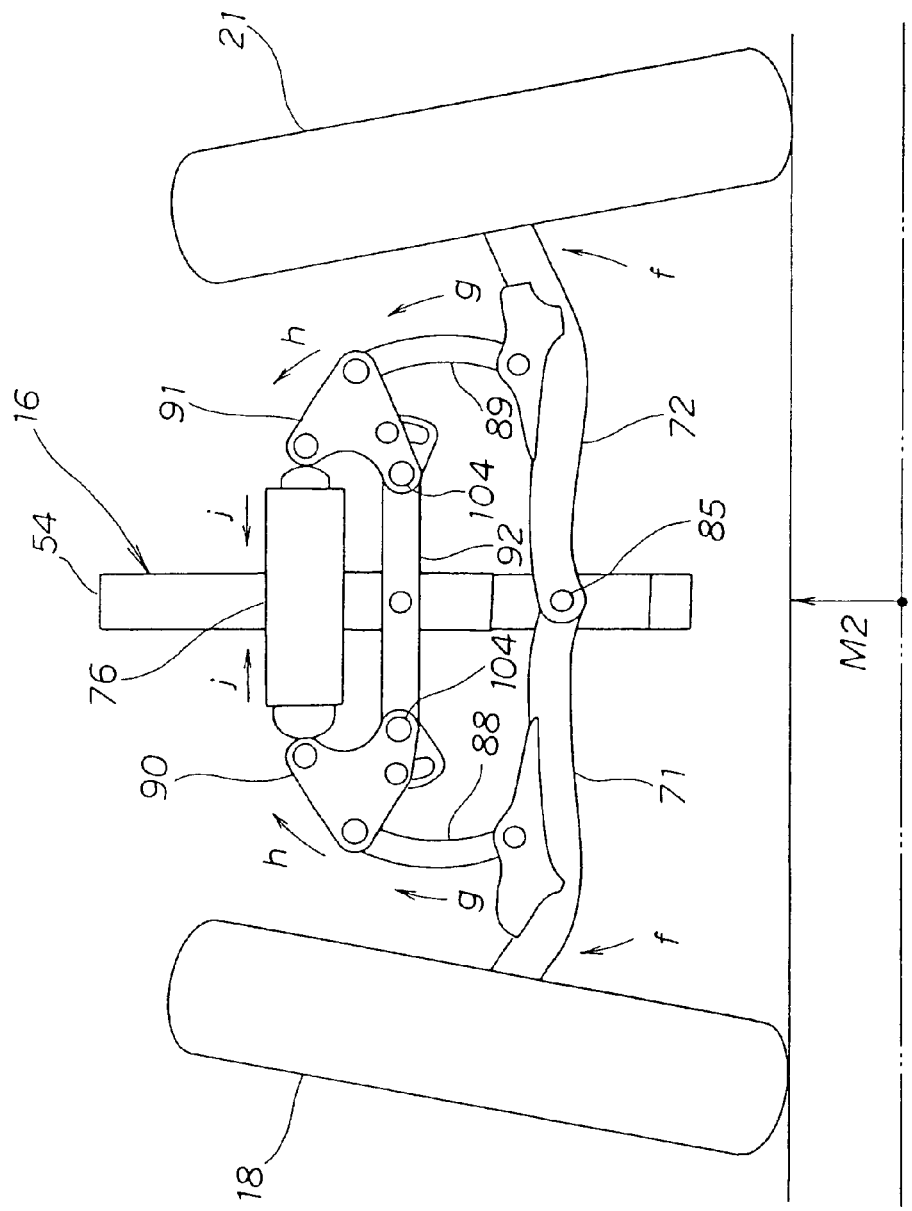
FIG. 13 is a second action diagram illustrating action of the rear suspension according to the present invention.

FIG. 13 is a second action diagram illustrating action of the rear suspension according to the present invention.

If both of the rear wheels 18 and 21 move upwardly by a movement amount M2 or the body frame 16 moves downwardly by a movement amount M2 with respect to the rear wheels 18 and 21 from the state of FIG. 11, then the suspension arms 71 and 72 swing upwardly as indicated by arrow marks f, f around the rear swing shaft 85 and the front swing shaft 136 (refer to FIG. 9). When this occurs, the arcuate links 88 and 89 move upwardly as indicated by arrow marks g, g to swing the bell cranks 90 and 91 in directions indicated by arrow marks h, h around the second bolt 104 to compress the shock absorber 76 as indicated by arrow marks j, j. As a result, a damping action by the shock absorber 76 is performed.

Figure 14:
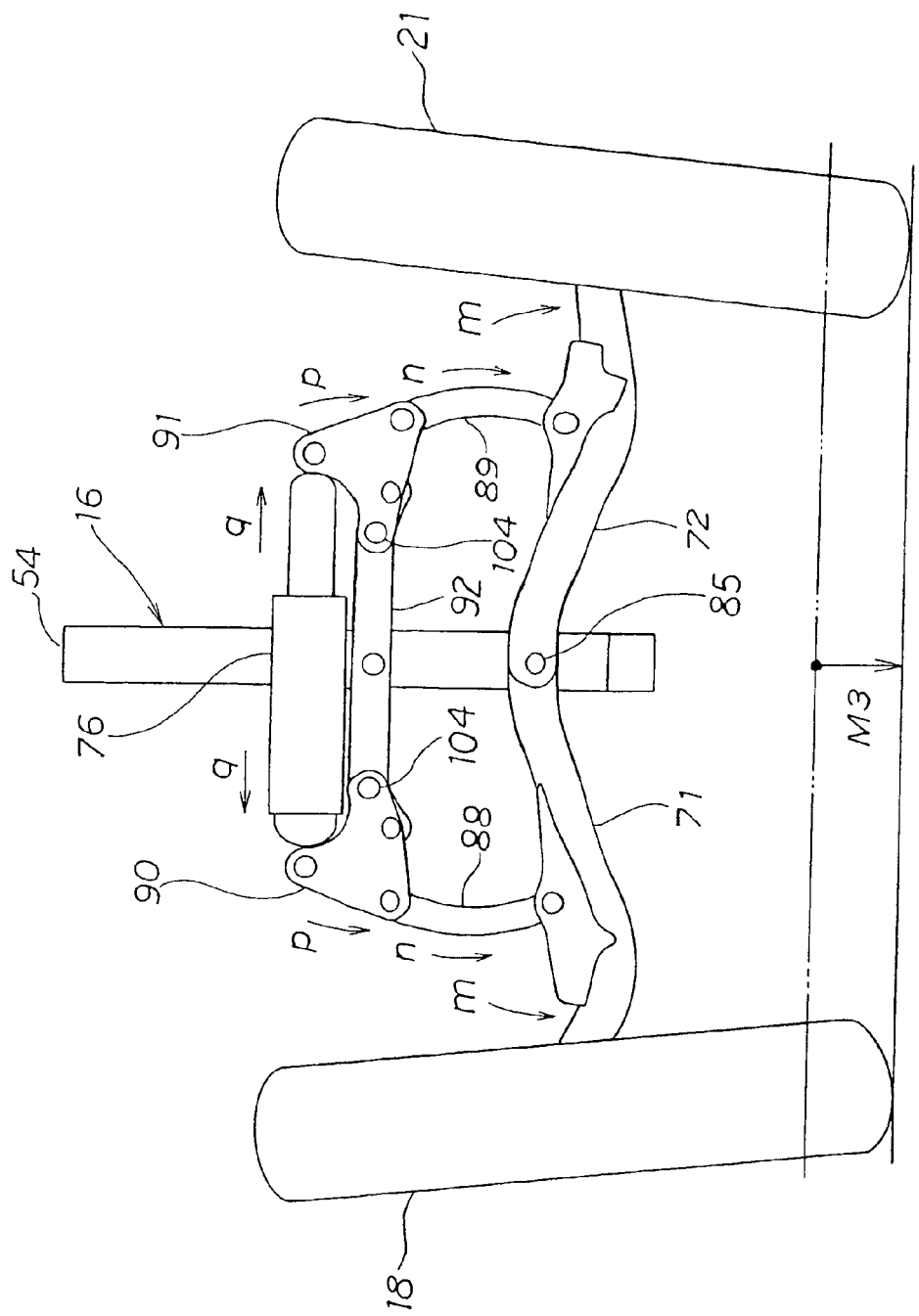
FIG. 14 is a third action diagram illustrating action of the rear suspension according to the present invention.

FIG. 14 is a third action diagram illustrating action of the rear suspension according to the present invention.

If both of the rear wheels 18 and 21 move downwardly by a movement amount M3 or the body frame 16 moves upwardly by a movement amount M3 with respect to the rear wheels 18 and 21 from the state of FIG. 11, then the suspension arms 71 and 72 swing downwardly as indicated by arrow marks m, m around the rear swing shaft 85 and the front swing shaft 136 (refer to FIG. 9). In this situation, the arcuate links 88 and 89 move down as indicated by arrow marks n, n to swing the bell cranks 90 and 91 in directions indicated by arrow marks p, p around the second bolt 104 thereby to allow the shock absorber 76 to expand as indicated by arrow marks q, q. As a result, a damping action by the shock absorber 76 is performed.

Figure 15:
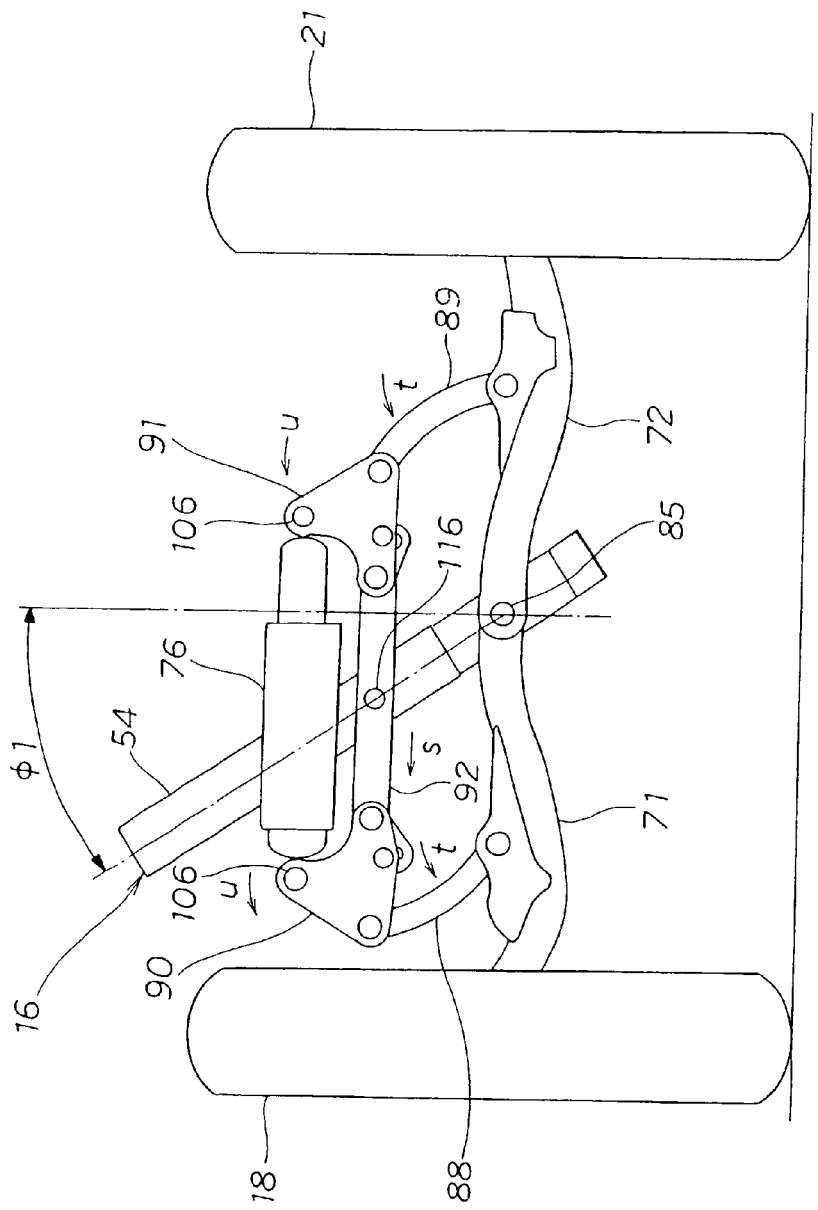
FIG. 15 is a fourth action diagram illustrating action of the rear suspension according to the present invention.

FIG. 15 is a fourth action diagram illustrating action of the rear suspension according to the present invention.

If the body frame 16, here the L pipe 54, rocks leftwardly of the vehicle body by an angle 0.1, then the connection member 92 connected to the L pipe 54 by the through-pin 116 moves in parallel in a leftward direction as indicated by an arrow mark s, whereupon the arcuate links 88 and 89 are inclined as indicated by arrow marks t, t and the bell cranks 90 and 91 move in parallel as indicated by arrow marks u, u. Since the distance between the third bolts 106, 106 of the bell cranks 90 and 91 does not vary, there is no expansion or contraction of the shock absorber 76.

At this time, since the body frame 16 rocks with respect to the connection member 92, reactive force for returning the body frame 16 to its original position (that is, the position of FIG. 11) by the rocking mechanism is exerted in a similar manner as described with reference to FIG. 8(c).

Figure 16:
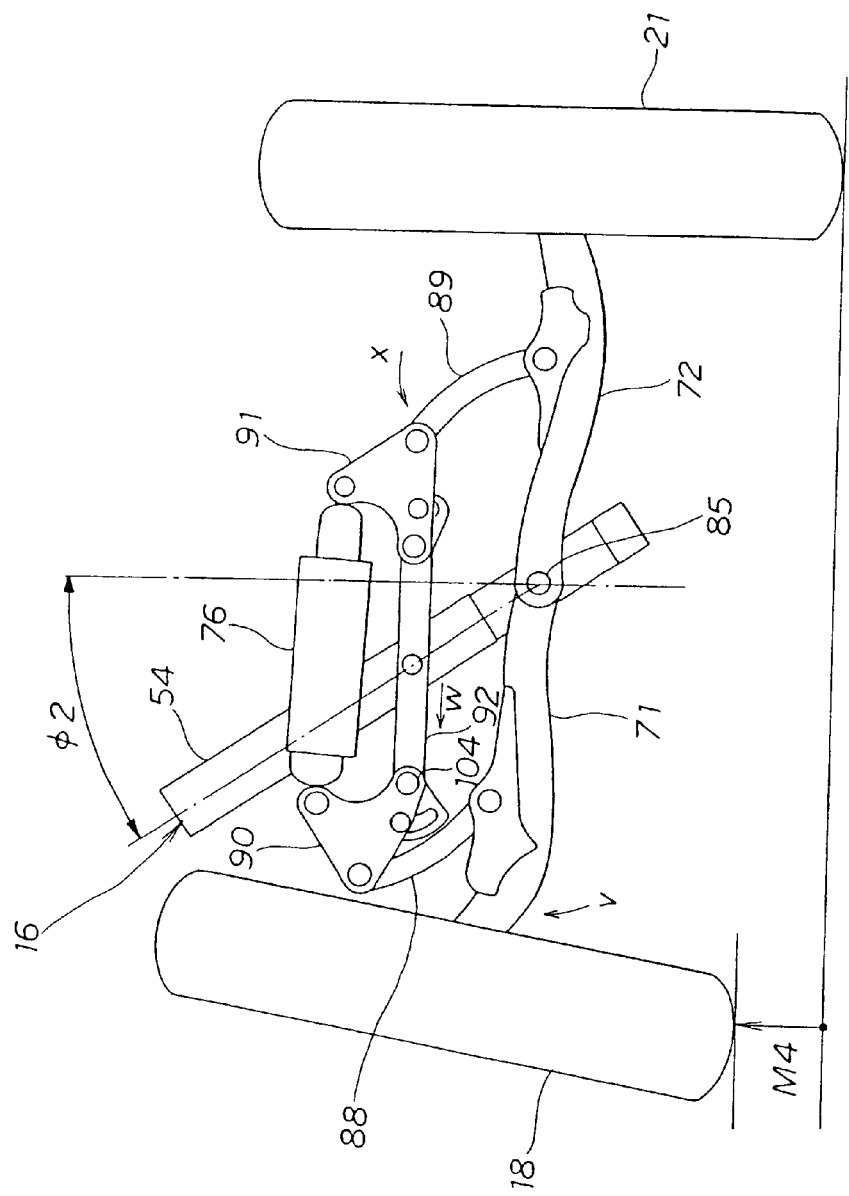
FIG. 16 is a fifth action diagram illustrating action of the rear suspension according to the present invention.
Figure 17:
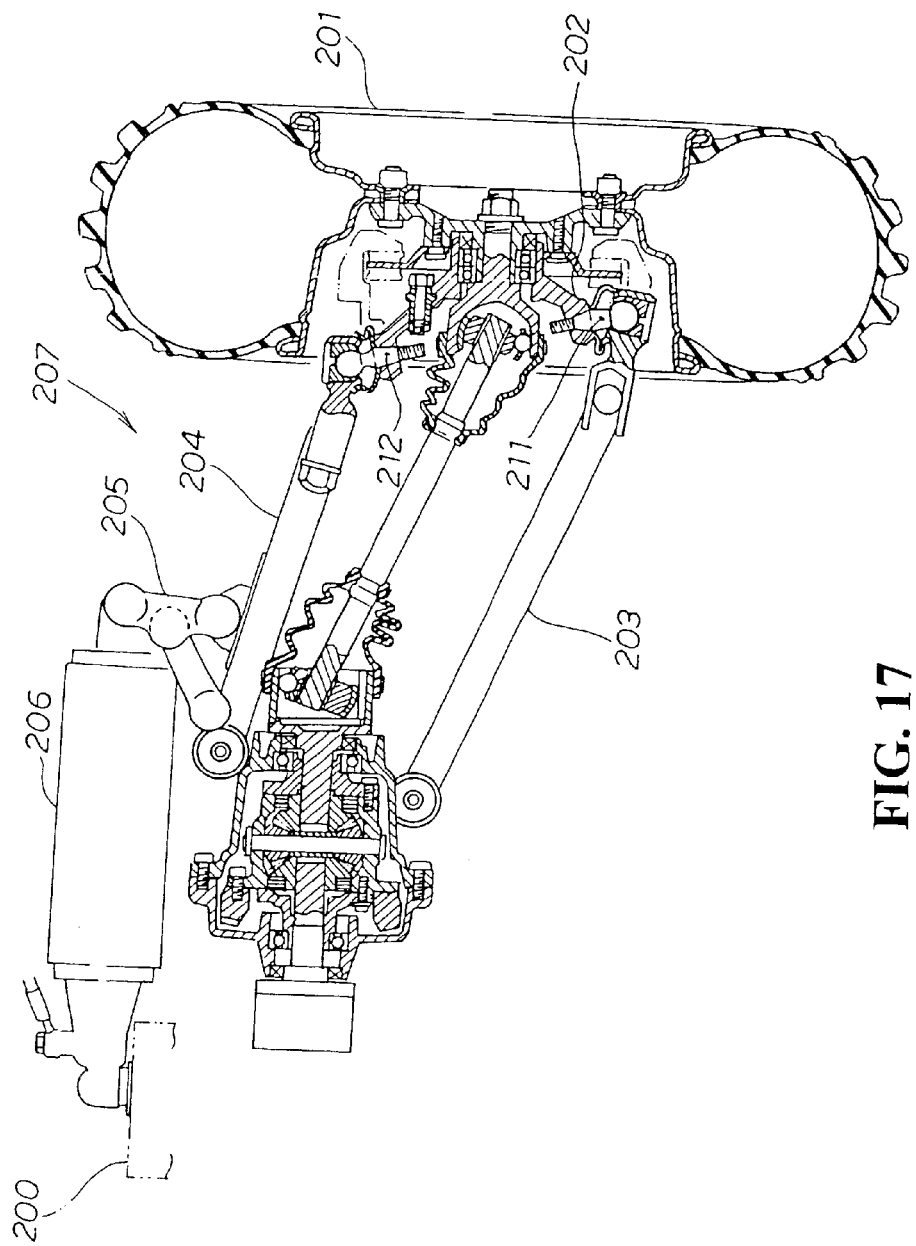
FIG. 17 is a sectional view showing a conventional suspension.

FIG. 16 is a fifth action diagram illustrating action of the rear suspension according to the present invention.

If the rear wheel 18 moves upwardly by a movement amount M4 and the body frame 16, here the L pipe 54, rocks by an angle 0.2 leftwardly of the vehicle body from the state of FIG. 11, then the suspension arm 71 swings upwardly as indicated by an arrow mark v around the rear swing shaft 85. This causes the front swing shaft 136 (refer to FIG. 9) and the connection member 92 to move leftwardly as indicated by an arrow mark w. Thereupon, the arcuate link 88 moves upwardly and is inclined leftwardly while the arcuate link 89 is inclined leftwardly as indicated by an arrow mark x, and the bell crank 90 swings in the clockwise direction around the second bolt 104 and moves leftwardly while the bell crank 91 moves leftwardly. As a result, the bell crank 91 compresses the shock absorber 76 to exert damping action.

According to the present invention, as described above with reference to FIGS. 3 and 11, the tricycle 10 with a rocking mechanism includes suspension arms 71 and 72 extending leftwardly and rightwardly from the body frame 16 and includes rear wheels 18 and 21 mounted for upward and downward movement independently of each other on the suspension arms 71 and 72, respectively. The rocking mechanism 93 permits leftward and rightward rocking movement of the body frame 16 with respect to the suspension arms 71 and 72 side and is provided between the rear wheels 18 and 21 side and the body frame 16 side. The left and right suspension arms 71 and 72 are connected by the shock absorber 76 and the arcuate links 88 and 89 and the bell cranks 90 and 91 are provided as connection means at the opposite ends of the shock absorber 76.

In response to upward and downward movement of the left and right suspension arms 71 and 72, the single shock absorber 76 can be expanded and contracted to effect damping action of the left and right suspension arms 71 and 72. According to the present invention, the weight can be reduced and the cost can be reduced when compared with the conventional tricycle wherein a shock absorber is provided for each of the left and right suspension arms 71 and 72.

Further, according to the present invention, the tricycle 10 with a rocking mechanism includes a connection means is composed of the arcuate links 88 and 89 mounted for swinging movement on the suspension arms 71 and 72 and the substantially L-shaped bell cranks 90 and 91 mounted for swinging movement at ends of the arcuate links 88 and 89. First bolts 103 are provided at bent portions of the bell cranks 90 and 91, and the second and third bolts 104 and 106 are provided at the opposite end portions of the bell cranks 90 and 91, the first bolts 103 are mounted at ends of the arcuate links 88 and 89 and the second bolts 104 are mounted on the body frame 16 side, that is, the connection member 92 mounted on the body frame 16. Further, the third bolts 106 are mounted at the end portions of the shock absorber 76.

In response to upward and downward movements of the suspension arms 71 and 72, the bell cranks 90 and 91 can be swung around the second bolts 104 through the arcuate links 88 and 89, respectively, and the shock absorber 76 provided between the third bolts 106, 106 of the left and right bell cranks 90 and 91 can be expanded and contracted. Consequently, damping action can be functioned with the single shock absorber 76.

Also, according to the present invention, the second bolts 104 of the left and right bell cranks 90 and 91 are connected to each other by the connection member 92 while the middle portion of the connection member 92 is mounted for swinging movement on the body frame 16, particularly on the rear end inclined portion 32B of the J frame 32. With this configuration, the L pipe 54 and the connection member 92 and the shock absorber 76 are disposed substantially in parallel to each other.

A parallel link mechanism can be formed from the left and right suspension arms 71 and 72, left and right arcuate links 88 and 89, left and right bell cranks 90 and 91 and connection member 92. As such, when body frame 16 rocks leftwardly and rightwardly, the distance between the left and right bell cranks 90 and 91 can be kept fixed and the shock absorber 76 is not expanded nor contracted at all. Consequently, rocking movement of the body frame 16 does not have an influence upon the damping action of the shock absorber 76.

In addition, according to the invention, the shock absorber 76 is disposed above the connection member 92.

If the suspension arms 71 and 72 swing upwardly, then the bell cranks 90 and 91 swing through the arcuate links 88 and 89 and the distance between the third bolts 106, 106 of the bell cranks 90 and 91 decreases. Therefore, since the shock absorber 76 is similar to that of shock absorbers disposed on the left and right in conventional tricycles, this conventional shock absorber can be used with the rear suspension 63 of the present invention. As such, there is no necessity to design a new or different shock absorber, thus an increase in cost can be suppressed.

Further, the shock absorber 76 can be covered from below by the connection member 92, thus protecting the shock absorber 76 from slashing mud, flying stones, and so forth.

It is to be noted that the resilient member of the present invention is not limited to a shock absorber composed of a damper and a compression coil spring but may be another shock absorber which makes use of resilient force of a rubber, resin or metal material or compressed gas.

Further, the arcuate links 88 and 89 shown in FIG. 7 are shaped arcuately in order to prevent interference thereof with any other part, but may otherwise have a linear configuration if they do not interfere with any other part.

The present invention exhibits the following effects due to the configuration described above.

According to the first aspect of the present invention, the left and right suspension arms are connected to each other by resilient means and connection means provided at the opposite ends of the resilient means. Consequently, in response to upward and downward movement of the left and right suspension arms, the single resilient means can be expanded and contracted to effect damping action of the left and right suspension arms. Thus, weight can be reduced and the cost can be reduced when compared with the conventional tricycle wherein a shock absorber is provided for each of the left and right suspension arms.

According to the second aspect of the present invention, the connection means includes links mounted for swinging movement on the suspension arms and substantially L-shaped bell cranks mounted for swinging movement at ends of the links. A first fulcrum is provided at a bent portion of each of the bell cranks and second and third fulcra are provided at the two end portions of each of the bell cranks. The first fulcra are mounted at the ends of the links and the second fulcra are mounted on the body frame side while the third fulcra are mounted at the end portions of the resilient means. Consequently, in response to upward and downward movements of the suspension arms, the bell cranks can be swung through the links, and the resilient means provided between the left and right bell cranks can be expanded and contracted. Consequently, damping action can be performed with the single resilient means.

According to the third aspect of the present invention, the left and right bell cranks are connected at the second fulcra thereof to end portions of a connection member while a middle portion of the connection members is mounted for swinging movement on the body frame, and the connection member and the resilient means are disposed substantially in parallel to each other. Consequently, a parallel link mechanism can be formed from the left and right suspension arms, left and right links, left and right bell cranks and connection member, and when the body frame rocks leftwardly and rightwardly, the distance between the third fulcra of the left and right bell cranks can be kept fixed and the resilient means is not expanded nor contracted at all. Consequently, rocking movement of the body frame does not have an influence upon the damping action of the resilient means.

According to the fourth aspect of the present invention, the resilient means is disposed above the connection member. Consequently, if the suspension arms swing upwardly, then the distance between the third fulcra of the bell cranks decreases. Therefore, since the resilient means is similar to that of shock absorbers disposed on the left and right as in the conventional tricycle, this conventional shock absorber can be used in the present invention. Since there is no need to design a new shock absorber, an increase in cost can be suppressed.

Further, the resilient means can be covered from below with the connection member, preventing splashed mud, and flying stones from damaging the resilient means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tricycle with a rocking mechanism, comprising:
   a pair of suspension arms extending leftwardly and rightwardly from a body frame;
   rear wheels mounted for upward and downward movement independently of each other on said suspension arms; and
   a rocking mechanism for permitting leftward and rightward rocking movement of said body frame with respect to a suspension arms side, the rocking mechanism being provided between said suspension arms side and a body frame side,
   wherein said left and right suspension arms are connected to each other by resilient means and connection means, the connection means including a pair of substantially L-shaped bell cranks, and the resilient means extending laterally between the pair of bell cranks.

2. The tricycle with a rocking mechanism according to claim 1, said connection means comprising:
   links mounted for swinging movement on said suspension arms, the substantially L-shaped bell cranks being mounted for swinging movement at ends of said links;
   a first fulcrum provided at a bent portion of each of said bell cranks;
   second and third fulcra provided at the two end portions of each of said bell cranks,
   wherein said first fulcra are mounted at the ends of said links, said second fulcra are mounted on said body frame side, and said third fulcra are mounted at the end portions of said resilient means.

3. The tricycle with a rocking mechanism according to claim 2, wherein said L-shaped bell cranks are left and right L-shaped bell cranks connected at said second fulcra thereof to end portions of a connection member while a middle portion of said connection member is mounted for swinging movement on said body frame, and said connection member and said resilient means are disposed substantially in parallel to each other.

4. The tricycle with a rocking mechanism according to claim 3, wherein said resilient means is disposed above said connection member.

5. The tricycle with a rocking mechanism according to claim 3, wherein the body frame includes a J frame having a lower horizontal portion extending substantially horizontally, a rear end inclined portion having an upper end side is displaced rearwardly with respect to a lower end side, and an upper inclined portion having a front end portion displaced upwardly with respect to a rear end portion, the right and left suspension arms being mounted on the rear end inclined portion of the J frame.

6. The tricycle with a rocking mechanism according to claim 2, wherein the links are arcuate-shaped.

7. The tricycle with a rocking mechanism according to claim 2, wherein each of the L-shaped bell cranks is composed of two crank plates and includes a first bolt serving as the first fulcrum, a second bolt serving as the second fulcrum, a third bolt serving as the third fulcrum, and a fourth bolt serving as a stopper pin for restricting the extending and contracting movement of the resilient means.

8. The tricycle with a rocking mechanism according to claim 7, wherein the connection member is formed with sectoral portions of a sectoral shape provided at the opposite ends thereof and includes arcuate elongated holes provided in the sectoral portions, respectively, the fourth bolts each serving as the stopper pin are fitted in the arcuate elongated holes to restrict the inclination angles of the bell cranks with respect to the connection member, respectively.

9. The tricycle with a rocking mechanism according to claim 5, wherein the connection member is mounted on the rear end inclined portion of the J frame through the rocking mechanism.

10. The tricycle with a rocking mechanism according to claim 1, wherein the rocking mechanism is a Neidhardt damper.

11. A tricycle with a rocking mechanism, comprising:
    a pair of suspension arms extending leftwardly and rightwardly from a body frame;
    rear wheels mounted for upward and downward movement independently of each other on said suspension arms; and
    a rocking mechanism for permitting leftward and rightward rocking movement of said body frame, the rocking mechanism and a connection member being mounted for swinging movement on said body frame by a through pin,
    wherein said left and right suspension arms are connected to each other by a shock absorber and connection means, the connection means including a pair of substantially L-shaped bell cranks provided at the opposite ends of said shock absorber, the shock absorber extending laterally between the pair of bell cranks.

12. The tricycle with a rocking mechanism according to claim 11, said connection means comprising:
    links mounted for swinging movement on said suspension arms, the substantially L-shaped bell cranks being mounted for swinging movement at ends of said links;

a first fulcrum provided at a bent portion of each of said bell cranks;

second and third fulcra provided at the two end portions of each of said bell cranks, wherein said first fulcra are mounted at the ends of said links, said second fulcra are mounted on said body frame side, and said third fulcra are mounted at the end portions of said shock absorber.

13. The tricycle with a rocking mechanism according to claim 12, wherein said L-shaped bell cranks are left and right L-shaped bell cranks connected at said second fulcra thereof to end portions of the connection member while a middle portion of said connection member is mounted for swinging movement on said body frame, and said connection member and said shock absorber are disposed substantially in parallel to each other.

14. The tricycle with a rocking mechanism according to claim 13, wherein said shock absorber is disposed above said connection member.

15. The tricycle with a rocking mechanism according to claim 13, wherein the body frame includes a J frame having a lower horizontal portion extending substantially horizontally, a rear end inclined portion having an upper end side is displaced rearwardly with respect to a lower end side, and an upper inclined portion having a front end portion displaced upwardly with respect to a rear end portion, the right and left suspension arms being mounted on the rear end inclined portion of the J frame.

16. The tricycle with a rocking mechanism according to claim 12, wherein the links are arcuate-shaped.

17. The tricycle with a rocking mechanism according to claim 12, wherein each of the L-shaped bell cranks is composed of two crank plates and includes a first bolt serving as the first fulcrum, a second bolt serving as the second fulcrum, a third bolt serving as the third fulcrum, and a fourth bolt serving as a stopper pin for restricting the extending and contracting movement of the shock absorber.

18. The tricycle with a rocking mechanism according to claim 17, wherein the connection member is formed with sectoral portions of a sectoral shape provided at the opposite ends thereof and includes arcuate elongated holes provided in the sectoral portions, respectively, the fourth bolts each serving as the stopper pin are fitted in the arcuate elongated holes to restrict the inclination angles of the bell cranks with respect to the connection member, respectively.

19. The tricycle with a rocking mechanism according to claim 15, wherein the connection member is mounted on the rear end inclined portion of the J frame through the rocking mechanism.

20. The tricycle with a rocking mechanism according to claim 10, wherein the rocking mechanism is a Neidhardt damper.

* * * * *